Feb. 4, 1936.　　　E. J. VON HENKE　　　2,029,846
COUPLING
Filed Jan. 3, 1934

INVENTOR
Edmund J. von Henke
BY
Gifford, Scull & Burgess
ATTORNEYS

Patented Feb. 4, 1936

2,029,846

UNITED STATES PATENT OFFICE 2,029,846

COUPLING

Edmund J. von Henke, Chicago, Ill., assignor to American Electric Fusion Corporation, Chicago, Ill., a corporation of Illinois Application January 3, 1934, Serial No. 705,043

2 Claims. (Cl. 285—86)

This invention relates to a new and useful improvement in coupling, the novel features of which will be best understood from the following description and the annexed drawing, in which I have shown a selected embodiment of the invention and in which.

The coupling is one adapted to be connected to the end of a hose 1, and for that purpose it comprises a nipple 2, here shown as a compression nipple within which the hose end may be inserted. The inner surface 3 of the nipple is adapted to engage the outer surface 4 of the hose, and this surface 3 has a diameter less than the diameter of the surface 4. In other words, the inside diameter of the nipple is less than the outside diameter of the hose, so that when the hose is inserted in the nipple it will be compressed. In this connection, it is, of course, understood that the hose is formed of compressible material, such material usually containing a rubber compound of some kind or at least having rubber as one of the materials entering into its make-up.

Figure 1:
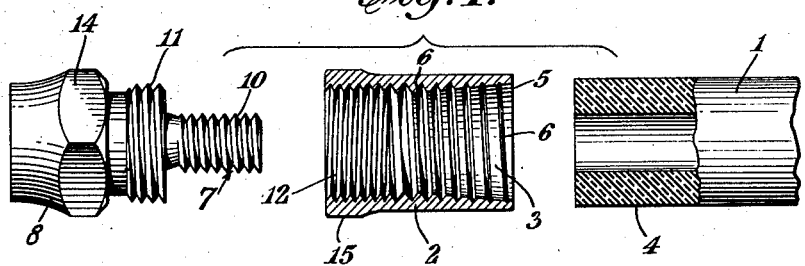
Fig. 1 is a view of the different parts forming the coupling and shown separated from each other, certain parts being shown in section and others in elevation.
Figure 2:
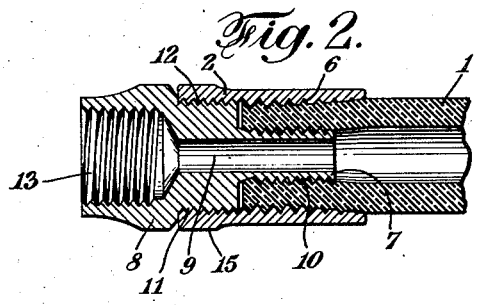
Fig. 2 is a longitudinal section through the coupling and hose as assembled.

The surface 3 is shown as being tapered away from the end 5 of the nipple which is adjacent the hose, and as also being threaded. In this form, the thread is shown as a spiral groove 6, and it will thus be seen that, as the hose end is inserted within the nipple, it will engage the surface 3 and the nipple may be turned so as to be screwed upon the hose, thus simultaneously working its way along the hose and locking itself thereto. The material of the hose will expand into the groove 6, or, looked at in another way, the tooth formed between convolutions of the groove will bite into the material of the hose until the parts are in some such position as shown in Fig. 2.

In the form shown, the thread formed by the groove 6 is left-hand, and threaded into the hose within the nipple is a tubular stem 7 of a connection 8 which has a bore 9 therethrough. The thread 10 on the exterior of the stem is right-hand or in opposite direction to the thread formed by the groove 6 so that it will be seen that, as the stem is forced into the interior of the hose and engages the inner surface thereof, it will compress the wall of the hose against the surface 3. This compression is, of course, aided to a certain extent by the taper of the surface 3 and by the fact that the outside diameter of the hose is greater than the inside diameter of the nipple.

In order to join the connection to the nipple, it is provided with threads 11 adapted to engage threads 12 on the interior of the nipple. These threads 12 are also right-hand and of the same pitch as the threads 10 so that, as the connection is threaded into the hose and simultaneously into the nipple, there will be no tendency to tear the hose, since the threads 10 and 11 are parallel to each other. As a matter of fact, the stem may be made of such a length that it may be threaded into engagement with the hose for some distance before the threads 11 and 12 catch.

The connection 8 is provided with suitable means, here exemplified as interior threads 13, for joining it to a pipe or any other member. The connection may also be provided with wrench-engaging surfaces 14, and the nipple may be provided with wrench-engaging surfaces 15.

From the above it will be seen that I have provided a coupling which is simple in character and which will be easily and at the same time positively locked to the hose. At the same time it may be manipulated by a wrench or any other tool without danger of loosening it from the hose. For example, any use of a wrench which would tend to loosen the nipple on the hose would be resisted by the opposite-handed thread on the stem. The wrench-engaging surfaces 14 and 15, being close together, may be engaged by the one wrench without danger of turning one part with respect to the other and without danger of turning the entire coupling loose from the hose.

While I have shown the invention as embodied in a specific form, it is to be understood that various changes in details may be made without departing from the scope of the invention, and I therefore do not intend to limit myself except by the appended claims.

I claim:

1. A hose coupling comprising a tubular compression nipple to receive a compressible hose end, said nipple having its inner surface threaded and tapered, with the larger diameter of the taper at the end of the nipple into which the hose is first inserted and with the smaller diameter materially less than the outside diameter of said hose end, whereby the nipple may be threaded on to said hose end and whereby said act of threading will progressively compress the hose end within the nipple and thereby reduce the inside diameter of the hose end, and a connection having threaded engagement with said nipple and also having an externally threaded tubular stem adapted to be threaded into said compressed hose end and of sufficiently large diameter to cause the threads of the nipple to bite into the compressed hose end in the nipple, the threads on said stem and on said inner surface of the nipple being of opposite hand.

2. A hose coupling comprising a tubular compression nipple to receive a compressible hose end, said nipple having its inner surface threaded and tapered, with the larger diameter of the taper at the end of the nipple into which the hose is first inserted and with the smaller diameter materially less than the outside diameter of said hose end, whereby the nipple may be threaded on to said hose end and whereby said act of threading will progressively compress the hose end within the nipple and thereby reduce the inside diameter of the hose end, and a connection having threaded engagement with said nipple and also having an externally threaded tubular stem adapted to be threaded into said compressed hose end and of sufficiently large diameter to cause the threads of the nipple to bite into the compressed hose end in the nipple, the threads on said stem and on said inner surface of the nipple being of opposite hand and the threads on said stem being of the same hand as, and parallel to, the threads of said threaded engagement between the nipple and the connection.

EDMUND J. von HENKE.